US008483952B2

(12) United States Patent  
Kerr et al.

(10) Patent No.: US 8,483,952 B2  
(45) Date of Patent: Jul. 9, 2013

(54) APPARATUS FOR AND METHODS OF PROVIDING INFORMATION ABOUT A ROUTE TO BE FOLLOWED BY A PERSON

(75) Inventors: Andy Kerr, Stenhousemuir (GB); Colin MacAlpine, Kinross (GB); Stuart Miller, Perthshire (GB); Howard James Williamson, Slamannan (GB)

(73) Assignee: Trapeze Software Inc., Mississauga, Ontario (CA)

( * ) Notice: Subject to any disclaimer, the term of this patent is extended or adjusted under 35 U.S.C. 154(b) by 922 days.

(21) Appl. No.: 11/911,343

(22) PCT Filed: Apr. 11, 2006

(86) PCT No.: PCT/GB2006/001317  
§ 371 (c)(1),  
(2), (4) Date: Sep. 22, 2009

(87) PCT Pub. No.: WO2006/109047  
PCT Pub. Date: Oct. 19, 2006

(65) Prior Publication Data  
US 2010/0062401 A1    Mar. 11, 2010

(30) Foreign Application Priority Data  
Apr. 11, 2005 (GB) .................................. 0507274.9

(51) Int. Cl.  
*G01C 21/00* (2006.01)

(52) U.S. Cl.  
USPC ......................................................... 701/421

(58) Field of Classification Search  
USPC .................. 701/400, 412, 413, 418, 421, 428  
See application file for complete search history.

(56) References Cited

U.S. PATENT DOCUMENTS

| 5,664,948 | A | 9/1997 | Dimitriadis et al. |
| 2002/0057212 | A1 | 5/2002 | Hamilton et al. |
| 2004/0082318 | A1 | 4/2004 | Lane |
| 2006/0025923 | A1* | 2/2006 | Dotan et al. .................. 701/207 |

FOREIGN PATENT DOCUMENTS

| EP | 1191501 A3 | 8/2002 |
| WO | 99/16036 | 4/1999 |

OTHER PUBLICATIONS

International Search Report for PCT/GB2006/001317 dated Aug. 28, 2006 received from European Patent Office.

* cited by examiner

*Primary Examiner* — Kim T Nguyen  
(74) *Attorney, Agent, or Firm* — Foley & Lardner LLP

(57) ABSTRACT

Apparatus and methods for training a person in route management are based on a personal computer. The apparatus may be used for example to train a bus driver to follow a new or changed route. A data store stores data streams corresponding to different kinds of information of the route, including video of the route, audio data, sound data, GPS and time data, and vehicle engine management data. A VDU and loudspeaker are used as output devices to present the plurality of data streams to a user such that they are co-related to the route to be followed. Data streams corresponding to different route information are not combined in the data store, but comprise cross-referable data. The computer is programmed to present the first data stream and the further data stream in a co-related manner via the output devices and in dependence upon the cross-referable data.

25 Claims, 5 Drawing Sheets

APPARATUS FOR AND METHODS OF PROVIDING INFORMATION ABOUT A ROUTE TO BE FOLLOWED BY A PERSON

CROSS REFERENCE TO RELATED APPLICATIONS

This application is a National Stage of International Application No. PCT/GB2006/001317, filed Apr. 11, 2006, which claims the benefit of Great Britain Patent Application No. 0507274.9, filed Apr. 11, 2005, the disclosures of which are expressly incorporated herein by reference in their entireties.

FIELD OF THE INVENTION

The present invention relates to apparatus for and methods of providing assistance in management of a route followed by a person and to a computer program product for configuring a computer to provide assistance in management of a route followed by a person.

BACKGROUND

The training of drivers of motor vehicles that follow routes, such as buses, has traditionally involved a trainer giving instructions to a driver as a route is being followed. More recently, video technology has been used to provide classroom training. Typically a route is filmed while an instructor is recorded as he gives guidance on driving technique that is appropriate to particular parts of the route and points out significant features on the route, e.g. accident black spots, road hazards, interchanges, etc. The moving picture of the route and accompanying sound track are then played back to trainees in the classroom often by means of computer based playback apparatus. General purpose computer platforms, such as Personal Computers, are often used for the purpose.

Typically, the moving picture track and the sound track are recorded together and then stored in a combined manner as video and sound data streams on an appropriate storage medium, such as on magnetic tape or in a hard disc drive. Thus, the co-relation of the moving picture track and sound track is maintained such that on play back of the data streams the instructor's commentary is properly synchronized with the moving picture of the route.

The present applicant has appreciated that such an approach has shortcomings when routes are liable to change over time. For example, a part of the route may change necessitating a change to the moving picture track. A known approach to accommodating such a change is to re-record the whole route. However, this approach can be time consuming, laborious and expensive where only part of a whole route has changed.

An alternative known approach is to re-record only the changed part of the route to produce a new portion of track. A video editing suite is then used to incorporate the new portion of track in the existing moving picture track for the whole route and produce a modified video data stream for storage combined with the sound data stream on the chosen storage medium. This approach has the advantage of saving on time and labour at the re-recording stage. However, the burden is shifted to the video editing stage, which can be laborious and normally requires skilled operation to ensure proper co-relation of the new portion of track with the existing track.

A further example of the shortcomings of the conventional approaches is where the route has changed in the sense of requiring a further track of information of a different kind, e.g. motor vehicle speed along the route. According to the first conventional approach the entire route would need to be re-filmed along with re-recordal of the sound track and recordal of the further track of information. According to the second conventional approach the further track of information could be recorded alone. However, use of an editing suite would be required to properly co-relate the further track of information with the existing tracks of information.

SUMMARY

The present invention has been devised in the light of the applicant's appreciation of the above noted shortcomings of the conventional approaches. Thus according to a first aspect of the present invention there is provided apparatus for providing assistance in management of a route followed by a person, the apparatus comprising a data store configured to store a plurality of data streams corresponding to different kinds of information of a route followed by a person, data output means operable to output the plurality of data streams to a user such that they are co-related to the route followed by the person, and data handling means operable to provide the stored plurality of data streams to the data output means, in which the plurality of data streams comprises a first data stream and a further data stream, the first and further data streams corresponding to different route information to each other, the data store is configured such that the plurality of data streams are not combined in the data store and such that the plurality of data streams comprise cross-referable data, and the data handling means is operable to provide the first data stream and the further data stream in a predetermined manner to the data output means and in dependence upon the cross-referable data such that the first and further data streams are output by the data output means in a substantially co-related manner.

In use, a plurality of data streams corresponding to different kinds of information, such as video and sound data streams, are stored in the data store of the apparatus such that they comprise cross-referable data. If a route changes a user can record fresh information, such as video, for the changed part of the route only, which is stored along with its cross-referable data in the data store as the further data stream. Alternatively, a further track of information of a different kind, e.g. motor vehicle speed along the route, can be recorded alone and stored along with its cross-referable data in the data store as the further data stream. In both cases the changed store of data streams can be presented to a user of the apparatus such that co-relation of the data streams to the route is maintained by means of the cross-referable data. Thus the prior art requirement for re-recordal of an entire route or reliance upon an editing suite to provide for co-relation may be obviated.

More specifically, the first data stream and the further data stream may correspond to information of different parts of the route to each other. For example, the first data stream may correspond to the whole of the route and the further data stream may correspond to only part of the route. As an alternative example, the first data stream may correspond to a first half of the route and the further data stream may correspond to a second half of the route. Thus, it is to be understood that the first and further data streams can overlap in part or in whole, or they can abut. Accordingly, the data handling means may be operable to provide at least a part of the first data stream and at least a part of the further data stream at different times to the data output means.

Alternatively or in addition, the first data stream and the further data stream may correspond to the same kind of information, e.g. the first and further data streams may correspond to video data.

Alternatively, the first data stream and the further data stream may correspond respectively to different kinds of information, e.g. the first data stream may correspond to video data and the further data stream may correspond to comment data. The comment data might, for example, represent a fresh comment recorded on account of a change to the route.

Alternatively or in addition, the plurality of data streams may comprise at least two data streams corresponding respectively to information of a different kind.

Alternatively or in addition, one of the plurality of data streams and the further data stream may correspond to the same kind of information.

In addition, the one of the plurality of data streams and the further data stream may correspond to information of the same part of the route. For example, the one of the plurality of data streams may correspond to video data for an entire route during summer and the further data stream may correspond to video data for the entire route during another season, such as winter.

More specifically, the data handling means may be configured for user operable selection between the one of the plurality of data streams and the further data stream.

Alternatively or in addition, the first data stream may be a video data stream. Thus, for example a changed part of the route might be re-filmed and the re-filmed moving picture stored as the further data stream in the data store with the first data stream being an existing video stream. Upon presentation of information of a route followed by a person to a user of the apparatus, the data handling means may operate to provide the further video data stream and the existing video data stream at different times to the data output means and in dependence upon the cross-referable data.

Alternatively or in addition, the data handling means may be operable to provide only a part of the first data stream to the data output means. For example, where a middle part of a route has changed a first part of the first data stream may be provided to the data output means. In addition, the data handling means may then be operable to provide the further data stream to the data output means. The further data stream might, for example, correspond to the middle part of the route.

In addition, the data handling may then be operative to provide another part of the first data stream to the data output means. The other part of the first data stream might, for example, be the end part of the first data stream. Thus, the data handling means may be operable to provide at least two parts of the first data stream to the data output means, the two parts being spaced apart from each other on the route.

Alternatively or in addition, the cross-referable data may comprise location data corresponding substantially to a location on the route followed by the person. The location data might be acquired when route information is being recorded. The location data might, for example, be derived from a global navigation satellite system such as Global Positioning System (GPS), GLONASS and Europe's GALILEO system.

Alternatively or in addition, at least one of the plurality of data streams may comprise a plurality of cross-referable data, the plurality of cross-referable data being related respectively to spaced apart elements of a data stream.

Alternatively or in addition, the data handling means may be operable to identify, in dependence upon the cross-relatable data, one of the further data stream and the first data stream from the data store as the other of the further data stream and the first data stream is being output by the data output means, in readiness for providing the one of the further data stream and the first data stream to the data output means. Thus, real time or at least near real time switching from one data stream to the next can be provided for.

In addition, the data handling means may be operable to convey the identified one of the further data stream and the first data stream from the data store as the other of the further data stream and the first data stream is being output by the data output means.

Alternatively or in addition, the plurality of data streams may comprise first and second data streams, two of the first, second and further data streams being cross-referable by a first kind of cross-referable data and a different two of the first, second and further data streams being cross-referable by a second kind of cross-referable data, the first and second kinds of cross-referable data being different to each other. For example, the first kind of cross-referable data might be GPS data and the second kind of cross-referable data might be time data. Thus, the first, second and further data streams can be provided to the data handling means in a substantially co-related manner.

Alternatively or in addition, the plurality of data streams may comprise two further data streams and the data handling means may be operable to select between providing a first and a second of the further data streams to the data output means. More specifically, the data handling means may be operable to select between the first and second of the further data streams in response to a user input. For example, where the second of the two further data streams corresponds to information relating to a route diversion, a selection can be made to present the second data stream temporarily to a user of the apparatus.

In addition, the plurality of data streams may further comprise a third further data stream and the data handling means may be operable to select the second and third further data streams, perhaps in response to a user input. The second and third further data streams may overlap at least in part and the data handling means may be operable to provide the second and third further data streams in turn to the data output means. For example, the second further data stream may correspond to a diversion to the first further data stream and the third further data stream may correspond to a diversion to the second further data stream.

Alternatively or in addition, the first further data stream may be co-relatable with at least one additional data stream for output thereof by the data output means.

More specifically, the apparatus may be configured such that upon selection by the data handling means of the second further data stream, the first further data stream and its co-relatability with the at least one additional data stream is maintained. Thus, upon re-selection of the first further data stream, e.g. upon removal of the route diversion, the first further data stream and the at least one additional data stream can be output in a co-related manner. Thus, the need to re-relate the at least one additional data stream with the first further data stream can be avoided.

Alternatively or in addition, the data store may be configured to store the first data stream and the further data stream such that each comprises first and second different kinds of cross-referable data.

More specifically, the plurality of data streams may comprise two further data streams and the data handling means may be operable to provide the first data stream and one of the two further data streams in a predetermined manner to the data output means and in a co-related manner in dependence upon the first kind of cross-referable data, the data handling means being further operable to select one of the two further data streams for provision to the data handling means in dependence upon the second kind of cross-referable data. Thus, for example, the first kind of cross-referable data might be location data and the first of the two further data streams may correspond to information relating to following a route around a right hand corner, and the second of the two further data streams may correspond to information relating to following a route around a left hand corner. The data handling means may select an appropriate one of the two further data streams in dependence upon a second kind of cross-referable data.

The apparatus for providing assistance in management of a route may be configured to present information for use in training of persons to follow the route.

Alternatively or in addition, the apparatus for providing assistance in management of a route may be configured to present information for use in route-risk assessment or route planning.

Indeed, it is to be understood that the term management of a route is to be construed as covering in particular but not exclusively training of a person to follow a route, route-risk assessment, route planning, route re-planning, route familiarisation, analysis of a performance of a person following a route.

Where the term management of a route is used with reference to apparatus for providing assistance in the management of a route followed by an operator controlled vehicle the term management of a route is to be construed as covering in particular but not exclusively analysis of the performance of the vehicle with reference to the different kinds of information of the route followed by the person.

The apparatus for providing assistance in management of a route may be configured to present information relating to one route selectable from a plurality of routes.

More specifically, the apparatus may be configured such that the selection from a plurality of routes may only be made by a person other than a person to whom the apparatus is giving assistance. For example, the apparatus may be configured such that the selection from a plurality of routes may be made by a trainer, a supervisor or similar such person.

Alternatively or in addition, the data store may be configured to store data streams corresponding to information of first and second routes, a data stream of each of first and second routes comprising at least two consecutive data streams, at least one of the consecutive data streams being common to the first and second routes, and the data handling means being operable to provide a data stream for one of the first and second routes in dependence upon the cross-referable data such that the consecutive data streams are co-related to a selected route.

Alternatively or in addition, the different information of a route followed by a person may comprise at least two selected from the group consisting of: video, sound, comments, graphics, location, acceleration in one or more axes, direction of travel, and fuel consumption, a plurality of engine and gearbox management data and throttle position of a motor vehicle.

Alternatively or in addition, the data handling means may be further configured to optionally provide for user editing of the first and further data streams. For example, user editing may be selected by a user to optimise the co-relation of the first and further data streams. According to this embodiment the first and further data streams may comprise information relating to a shared part of the route, i.e. the first and further data streams may overlap. The feature of user editing can be useful to change a co-relation of the first and further data streams effected by the data handling means. For example, user editing may be useful where a change from one data stream to the other takes place at or too near to a busy junction or where the cross-referable data is of limited accuracy providing for imperfect co-relation by the data handling means.

In addition, the apparatus may be configured for user initiated storage in the data store of user edited first and further data streams.

In a form of the invention the data store may be configured to store the plurality of data streams and the cross-referable data in respective mark-up documents and the data handling means may be operative to access data stored in the mark-up documents, read the stored data and provide the stored data to the data output means.

The use of a mark-up language in an electronic system can provide for advantageous performance, e.g. in respect of portability or data handling efficiency. In the present invention, the mark-up documents present the data in a form that can permit the data stream information type and the location data to be identified and accessed by tags. The tags enable the data handling means to navigate through and read the stored mark-up documents.

The mark-up documents may be extensible mark-up documents, which permit the creation of structured documents and data structures, which reflect the content of the documents directly and without regard to where the content appears in a document structure.

Alternatively or in addition, the apparatus for providing assistance in the management of a route followed by a person may be apparatus for providing assistance in the management of a route followed by an operator controlled object.

More specifically, the operator controlled object may be an operator controlled vehicle.

More specifically, the operator controlled vehicle may be an operator controlled land vehicle.

More specifically, the operator controlled land vehicle may be an operator controlled motor vehicle.

In an application of the first aspect of the present invention the first data stream may correspond to information of a route followed by a first person and the further data stream may correspond to information of the route followed by a second person. Thus, for example, information relating to the performance of two different persons, such as an expert and a trainee, can be output in a co-related manner.

In another application of the first aspect of the present invention the first data stream may correspond to information of a route followed by a first person and the further data stream may be based on a combination of information of the route followed by the first person and information of the route followed by a second person. Thus, for example, information relating to the performance of a first person, such as an expert, can be output in a co-related manner with information based on a combination of information for the expert and a second person, such as a trainee. More specifically, the combination of information could comprise aberrant performance of the second person obtained by comparison of the first and second persons' information. For example, where the route is being followed by an operator controlled vehicle the aberrant performance might relate to excessive acceleration of the trainee.

According to a second aspect of the present invention there is provided a method of providing assistance in management of a route followed by a person, the method comprising:

operating a data handling means of an apparatus to provide a plurality of data streams stored in a data store of the apparatus to a data output means, the plurality of data streams corresponding to different kinds of information of a route followed by a person, and operating a data output means of the apparatus to output the plurality of data streams to a user such that the plurality of data streams are co-related to the route followed by the person, in which the plurality of data streams comprises a first data stream and a further data stream, the first and further data streams corresponding to different route information to each other, the plurality of data streams are stored such that they are not combined in the data store and such that the plurality of data streams comprise cross-referable data, and the step of operating the data handling means comprises providing the first and further data streams in a predetermined manner to the data output means and in dependence upon the cross-referable data such that the first and further data streams are output by the data output means in a substantially co-related manner.

According to a third aspect of the present invention there is provided a computer program product for configuring a computer to provide assistance in management of a route followed by a person by causing the computer to carry out the steps of:

storing a plurality of data streams in a data store of the computer, the plurality of data streams corresponding to different kinds of information of a route followed by a person, operating a data output means of the computer to output the plurality of data streams to a user such that they are co-related to the route followed by the person, operating a data handling means of the computer to provide the stored plurality of data streams to the data output means, in which the plurality of data streams comprises a first data stream and a further data stream, the first and further data streams corresponding to different route information to each other, the step of storing comprises storing the plurality of data streams such that they are not combined in the data store and such that the plurality of data streams comprise cross-referable data, and the step of operating the data handling means comprises providing the first and further data streams in a predetermined manner to the data output means and in dependence upon the cross-referable data such that the first and further data streams are output by the data output means in a substantially co-related manner.

It is to be appreciated that the second and third aspects of the present invention may comprise any one or more of the features described above with reference to the first aspect of the present invention.

According to a further aspect of the present invention there is provided apparatus for providing assistance in management of a route followed by a person, the apparatus comprising a data store configured to store a first data stream and a further data stream corresponding to information of a route followed by a person, data output means operable to output the first and further data streams to a user such that they are co-related to the route followed by the person, and data handling means operable to provide the first and further data streams to the data output means, in which the data store is configured such that the first and further data streams are not combined in the data store and such that the first and further data streams comprise cross-referable data, and the data handling means is operable to provide first and further data streams in a predetermined manner to the data output means and in dependence upon the cross-referable data such that the first and further data streams are output by the data output means in a substantially co-related manner.

The further aspect of the present invention may comprise any one or more of the features described above with reference to the first to third aspects of the present invention.

BRIEF DESCRIPTION OF THE DRAWINGS

A specific embodiment of the present invention will now be described with reference to the accompanying drawings, in which.

DETAILED DESCRIPTION

Figure 1:
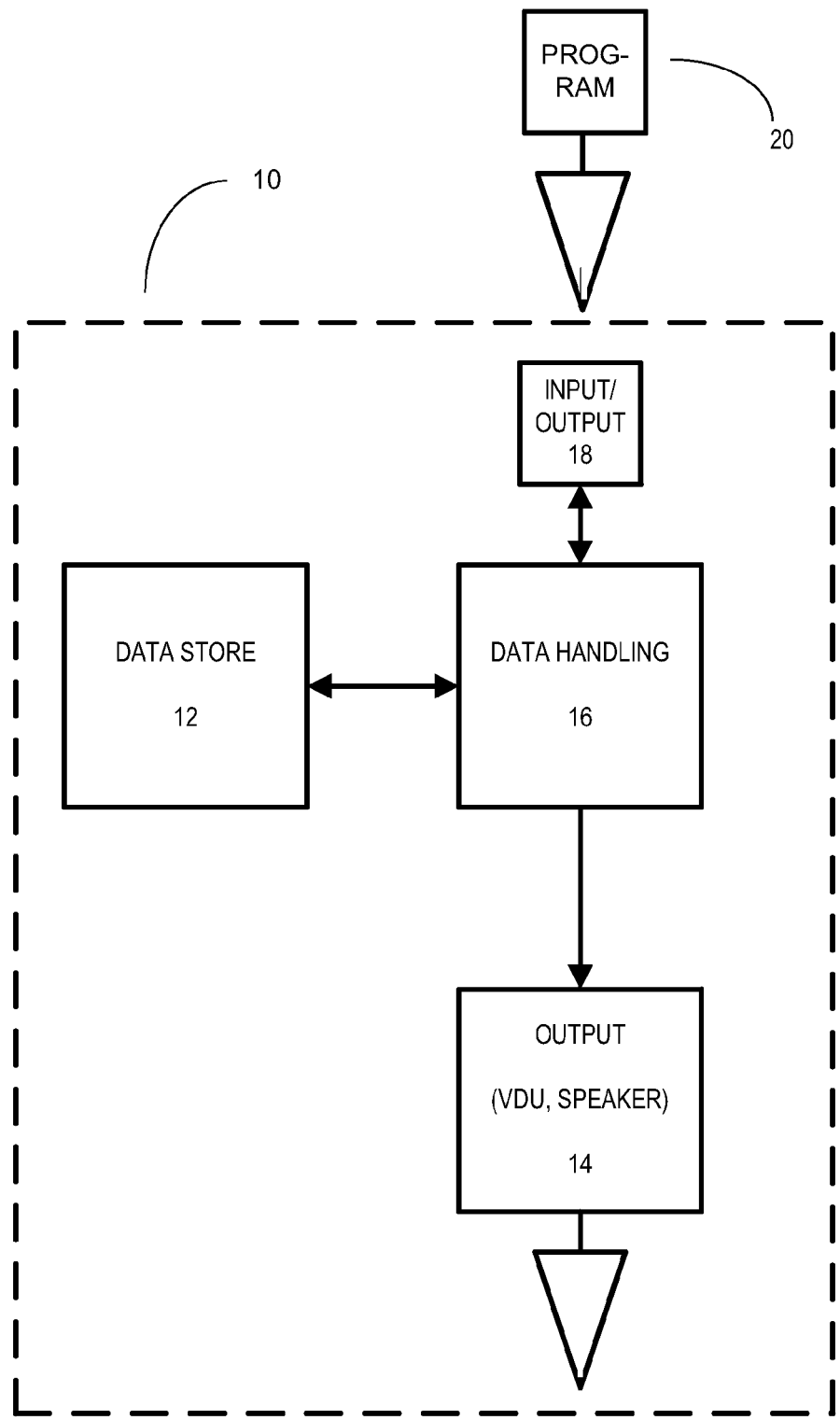
FIG. 1 is a block diagram representation of apparatus and a computer program product according to the invention.

FIG. 1 is a block diagram representation of a personal computer 10 (which constitutes apparatus for providing assistance in management of a route followed by a person). The personal computer 10 comprises a computer memory 12 (which constitutes a data store), a VDU and loudspeaker 14 (which constitutes data output means) and data handling means 16 constituted as at least one of control firmware, control software and control hardware. The personal computer 10 also comprises user operable input/output means 18 of a typical kind (e.g. a keyboard, CD-ROM drive, mouse, microphone, etc) that provides for user control and the input of data to and output of data from the personal computer. FIG. 1 also shows a computer program product 20, such as a CD-ROM, containing a computer program to configure the personal computer 10 to operate in accordance with the invention as described below. The computer program on the computer program product 20 is transferred to the personal computer 10 by means of the input/output means 18.

According to this specific embodiment the personal computer 10 is configured to present information to persons being trained to follow a route in an operator controlled motor vehicle, such as a bus.

Considering FIG. 1 in more detail upon configuring the personal computer 10 with the computer program from the computer program product 20, the data store is configured to store a plurality of data streams corresponding to different information of the route followed by the operator controlled motor vehicle. More specifically, the different information of the route comprises a video data stream of all or parts of the entire route along with sound data, graphical data, location data, acceleration data in one or more axes, turning characteristic data, fuel consumption data, throttle position data, and other engine management and vehicle data, such as may be provided by a vehicle engine management system. A further data stream may contain a series of comments configured to be presented in graphical form on the VDU 14 of the personal computer. The further data stream may alternatively contain other data such as audio, graphical, video or text data. In the specific example given in the immediately following paragraph, the further data stream is a fresh video data stream for at least a part of the route. The various data streams are stored in the data store 12 such that they are not combined in the data store. Instead each of the data streams is stored in the data store 12 along with at least one kind of cross-referable data. The cross-referable data is typically GPS data or time data and is put into use as described below.

Focusing on a specific example of further data stream, the data store 12 stores a fresh video data stream for a part, e.g. an end part, of the route, which represents a modification to an originally recorded route. Alternatively the fresh video data may be for the whole route recorded during a different season from that of the originally recorded data, e.g. during winter as opposed to during summer. Thus, the fresh video data stream and the video data stream of the entire route correspond to different route information to each other either in the sense of overlapping with each other and being for different parts of the route or in the sense of being coextensive with each other but relating to different seasons.

Figure 2:
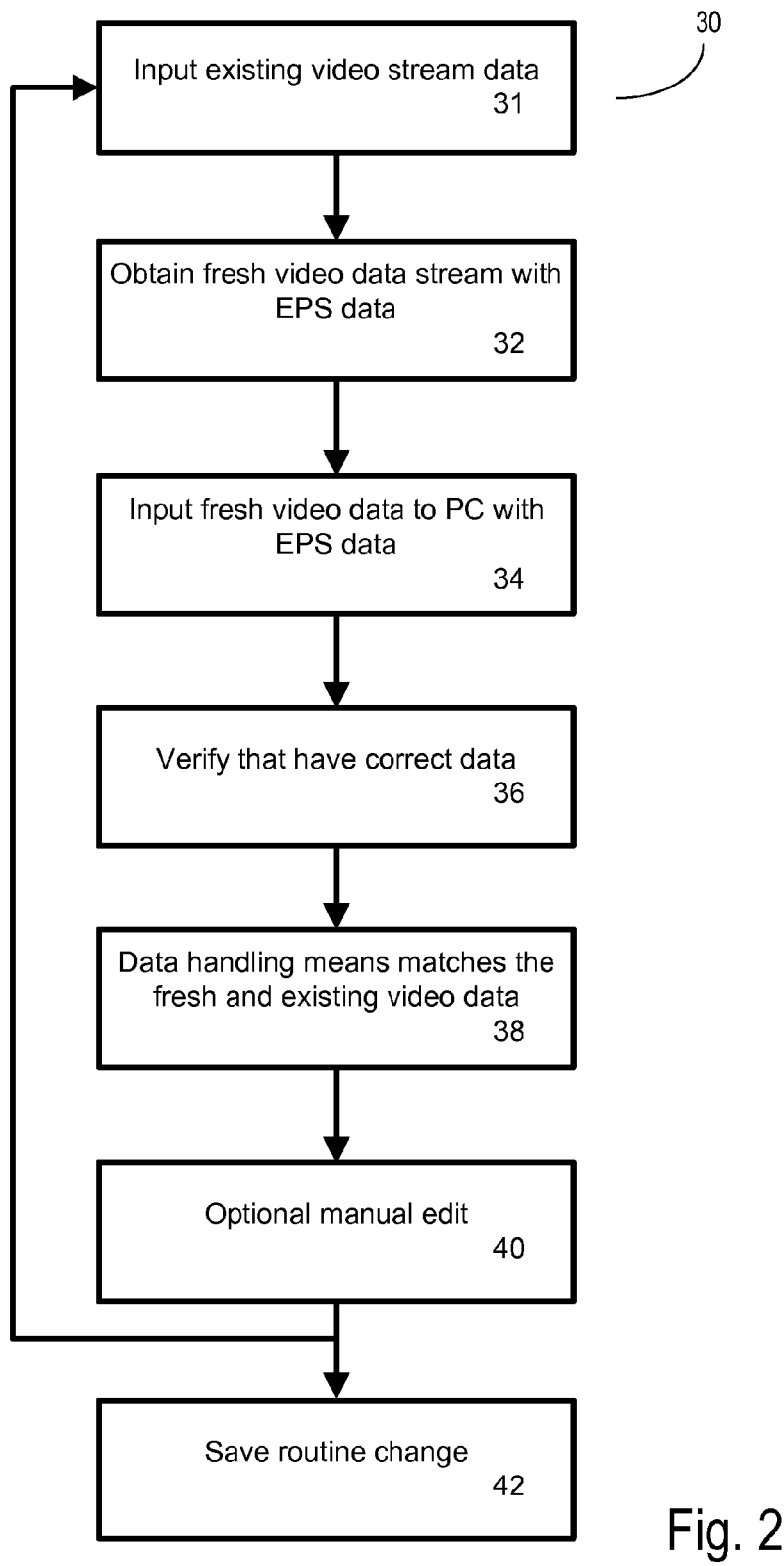
FIG. 2 is a flow chart representation of how an existing route is modified for operation with the present invention.

FIG. 2 is a flow chart representation 30 of how an existing route is modified to take account of the fresh video data stream for the end part of the route. As a first step 31 an existing video data stream is input into the apparatus. The existing data stream is co-relatable with a plurality of data streams corresponding to different information, of a kind detailed above with reference to FIG. 1, such as acceleration and fuel consumption data. Then the fresh video data stream is obtained along with its GPS data 32. The fresh data stream may be obtained by re-filming the appropriate part of the route while GPS data recordings are made. Alternatively, the fresh video data stream may have already been filmed and stored with its GPS data, e.g. as part of a different route on which the apparatus is operable. In either case the fresh video data stream is input with the GPS data to the personal computer (PC) 34. The fresh video data stream and the GPS data are stored in the data store 12 as described above.

In the following step 36 the fresh video data stream is checked, perhaps manually by presenting the fresh data stream to a supervisor or other such system operator, to ensure that it is appropriate, e.g. as to whether or not it relates to the route being changed. Then the data handling means 16 operates to match the fresh video data stream and the existing video data stream (which constitutes co-relation) on the basis of their respective GPS data 38 and the matched video data streams are presented to a user as a changed continuous data stream for review. The changed data stream comprises the original video data stream until the end, changed part of the route is reached at which point the fresh video data stream is presented to the supervisor instead of the remaining part of the existing video data stream.

At this stage, the supervisor may optionally manually edit the matching of the fresh video data stream and the existing video data stream 40. Optional manual editing may be used, for example, if the switch from the existing to the fresh video data stream takes place at an inconvenient part of the route, such as at a corner. Alternatively, the GPS data may, under certain circumstances be deemed to be insufficiently accurate to provide a seamless or near seamless switch to the fresh video data stream. At any rate, optional editing involves in effect adjusting an extent of overlap of the two video data stream or a switch point on the route from the existing video data stream to the fresh video data stream. In the event that optional manual editing is to be used the fresh video data must comprise an unchanged part of route to provide for an overlap with the existing video data stream.

The above steps are repeated as many times as are required to modify or update the route, with further fresh data streams obtained at step 32.

The route modification process concludes with the supervisor saving whatever change has been made to the matching of the two video data streams by the data handling means 42 in readiness for presentation to persons to be trained by use of the apparatus.

Figure 3:
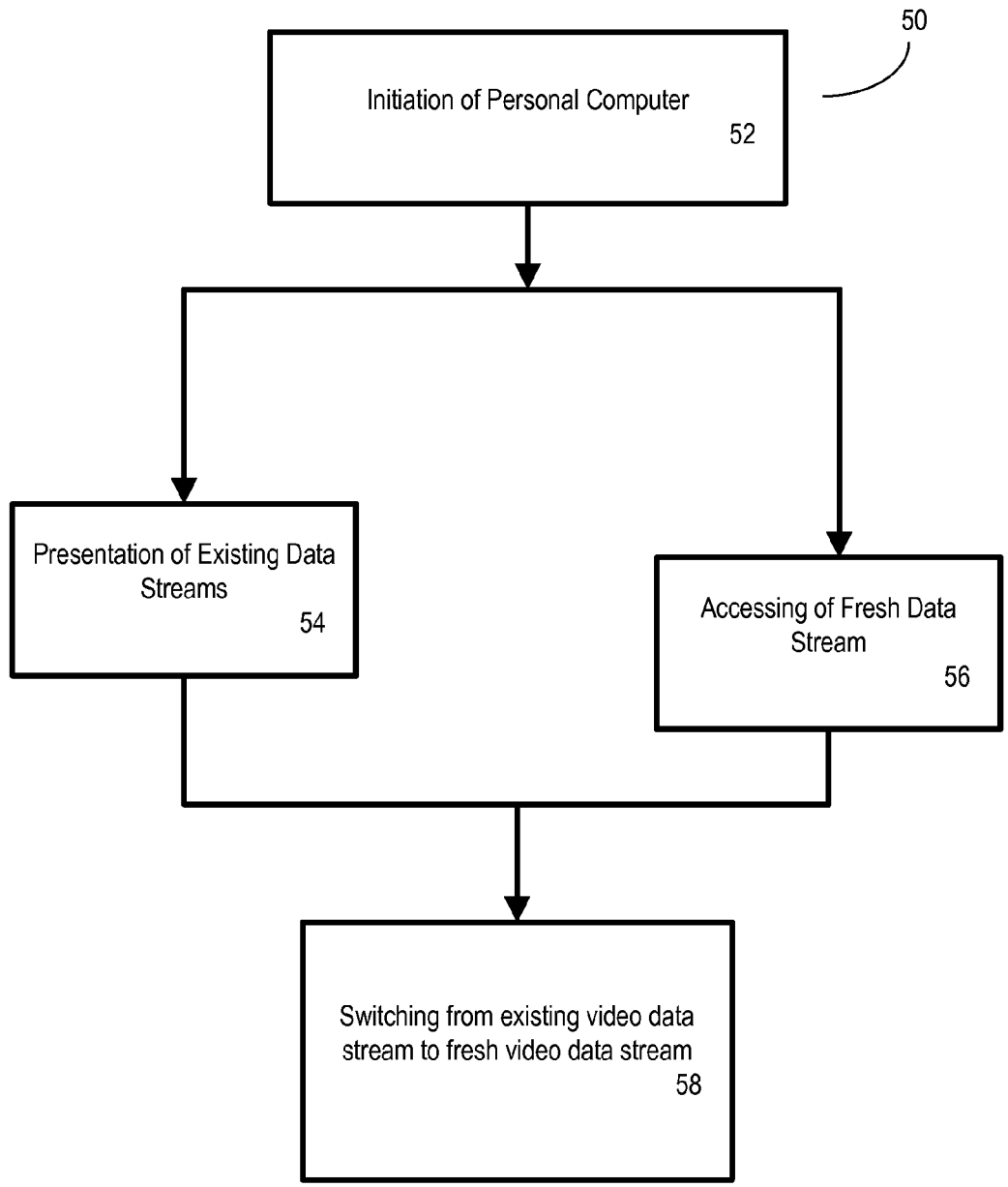
FIG. 3 is a flow chart representation of how information of a route is presented to a user in accordance with the invention.

FIG. 3 is a flow chart representation 50 of how information of a route changed in accordance with the method of FIG. 2 is presented to a user. As a first step 52 operation of the personal computer 10 of FIG. 1 is initiated to present information to one or more persons being trained. Then the data handling means 16 operates 54 to provide the video data stream and the other above noted data streams in a co-related manner for presentation on the VDU 14 to the persons being trained. Whilst the various data streams are being presented, the data handling means 16 accesses the fresh video data stream stored in the data store in readiness for presentation to the persons being trained 56. Monitoring of cross-relatable data of the various data streams being presented and comparison thereof with the cross-relatable data of the fresh video data stream provides the means for accessing the fresh video data stream. The accessing of the fresh video data stream in readiness for presentation is carried out on a separate thread of the data handling means to the ongoing presentation of the various data streams. When the changed part of the route is reached the data handling means switches 58 from the existing video data stream to the fresh video data stream on the basis of cross-reference data, such as GPS data, in each of the existing and the fresh video data streams. The switch in video data streams take into account any change saved as a result of the optional manual editing process. Thus, the modified route is presented to the persons being trained in a real or at least near real time manner.

Where the fresh video data stream constitutes a diversion, the diversion can be deselected such that the presented data stream comprises the existing video data stream alone. As the apparatus has continued to store the existing video data stream in its entirety along with its related data for the entire route, the return to the existing video data stream is readily accomplished without the need to recreate the related data for the formerly diverted part of the route.

Nesting of the fresh video data stream with one or more further fresh video data streams can be accomplished in accordance with the above description. For example, the fresh video stream might be a first diversion and a further fresh video data stream might be a second diversion to part of the first diversion.

The control program executed by the data handling means and data structure containing the stored data are in Extensible Mark-up Language (XML). Complete details of the XML program and data structure are not provided here as their creation is a routine matter for the programmer of ordinary skill, for example in accordance with XML programming principles and techniques as described by Beginning XML, $3^{rd}$ Edition, Wiley Publishing Inc., 2004.

Figure 4:
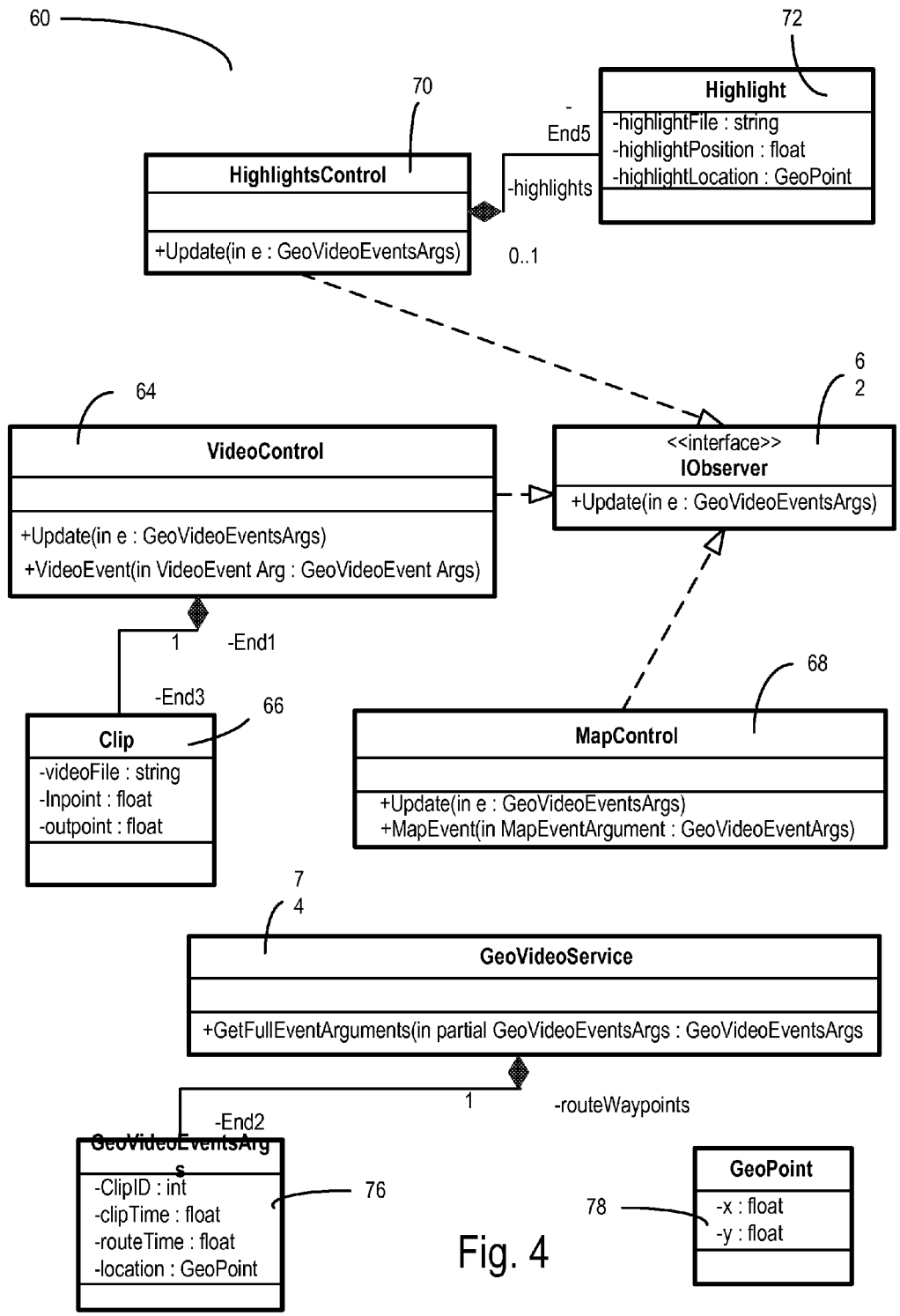
FIG. 4 is a Unified Modelling Language (UML) representation of data structures used in the present invention.

FIG. 4 is a static diagram representation 60 of data structures and program control used in the present invention. The data structures shown in FIG. 4 are, in common with FIGS. 1 to 3, representative of a wide range of data structures of different kinds of information. As the representation is in Unified Modelling Language (UML) the syntax will be recognized by the programmer of ordinary skill. The representation shows an IObserver element 62, a VideoControl element 64 along with a Clip element 66, which is a video data stream for use by the program of the present invention. Clip element 66 is representative of a series of such Clip elements queued by the controlling program to present a continuous stream of video data formed from the series of clips.

The IObserver element 62 is the agent of the controlling program. The VideoControl element 64 is capable of initiating and responding to an event, as is reflected by the 'Update' and 'VideoEvent' functions shown in FIG. 4.

The representation of FIG. 4 also has a MapControl element 68, which relates to a graphic display of a route being presented by the program of the present invention, and a HighlightsControl element 70, along with a Highlight element 72, which is highlight data for use by the program of the present invention. Like the VideoControl element 64 the MapControl element 68 is capable of initiating and responding to an event whereas the MapControl element 68 is only capable of responding to an event. As can be seen, each of the Highlight 72 and Clip 66 elements relate respectively to highlight (e.g. comment) data and video data which are each associated with cross-referable data. In the case of the Clip elements 66 the cross-referable data is the start and finish time of the video data. In the case of the Highlight element 72 the cross-referable data is location data.

A GeoVideoService element 74 provides a means of cross-referring data of different kinds, such as the different kinds of data of the Highlight 72 and Clip elements 66. The cross-referral of the data is by reference to the GeoVideoEventsArgs element 76 and provides for co-location of data streams on the basis of different cross-referable data. The co-location of the data streams having the same and different cross-referable data is in accordance with the description given above with reference to FIGS. 1 to 3. The Geo-Point element 78 relates to the syntactical form of GPS data used by the program of the present invention.

Figure 5:
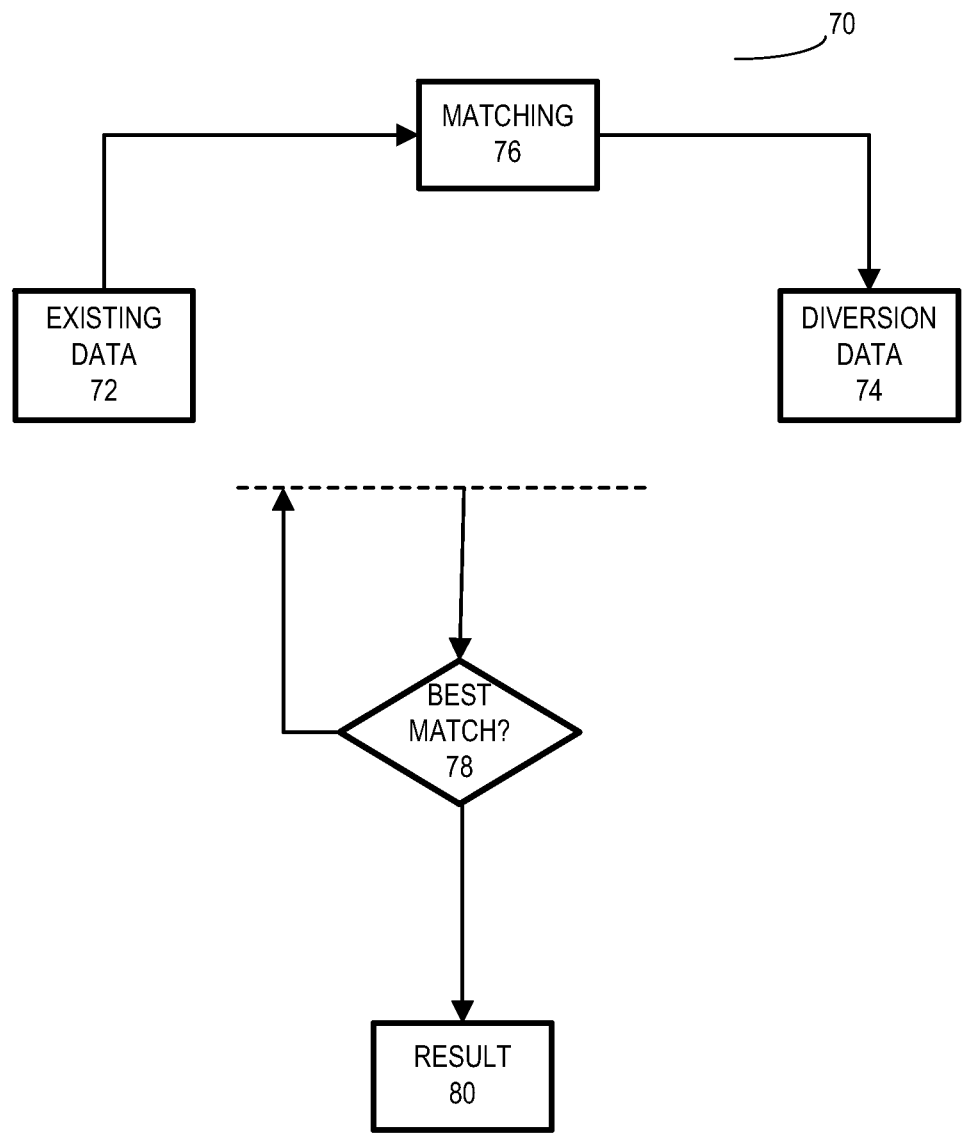
FIG. 5 is a representation of how the data structures of FIG. 4 are co-related for presentation to a user.

FIG. 5 shows how data structures of FIG. 4 are co-related for presentation to a user. The data structures of FIG. 4 include Clip elements 66 for an existing route (not shown) and a diversion (not shown). The Clip elements 66 for the existing route and the diversion are respectively expressed in XML in terms of a DiversionAdmin Class and a RouteAdmin Class, as referred to below in the brief description of Annex A. Referring again to FIG. 5, the Clip element or data structure for the existing route 72 is matched to the Clip element or data structure for the diversion 74 by means of matching operation 76. Matching operation 76 corresponds to step 38 in FIG. 2. Matching of the data structure for the existing route 72 and the data structure for the diversion 74 proceeds, perhaps with manual editing should it be required (as discussed above with reference to FIG. 2), until a best match is achieved 78. When the best match is achieved the result 80 is two data structures that are properly co-relatable for subsequent output to a user of the apparatus.

Annex A contains significant information relating to the XML data structures and program control used in the present invention and described with reference to FIGS. 4 and 5. More specifically, information is provided for a Diversion Admin Class and a Route Admin Class, followed in turn by the GeoVideoService Class information and the GeoVideoEventsArgs Class information.

Annex
VideoRouteTrainer.Admin.DiversionAdmin Class
Inherits From Inovas.VideoRouteTrainer.Admin.RouteAdmin Class

| Attributes | |
|---|---|
| Members | Description |
| videoDiversion | Placeholder for the diversion Video Control |
| intersection1 | Array containing two GeoVideoEventArguments representing the start of the diversion |
| intersection2 | Array containing two GeoVideoEventArguments representing the end of the diversion |
| geoVideoServiceDiversion | The GeoVideo Service representing the diversion being added |
| geoVideoExistingRoute | The GeoVideo Service representing the existing route |
| geoVideoServiceDiversionComplete | The GeoVideo Service that will represent the addition of both routes |
| mainMin1 | Geo Video event argument representing the minimum position on the existing route for the start intersection. |
| mainMax1 | Geo Video event argument representing the maximum position on the existing route for the start intersection. |
| diversionMin1 | Geo Video event argument representing the minimum position on the diversion route for the start intersection. |
| diversionMax1 | Geo Video event argument representing the maximum position on the diversion route for the start intersection. |
| mainMin2 | Geo Video event argument representing the minimum position on the existing route for the end intersection. |
| mainMax2 | Geo Video event argument representing the maximum position on the existing route for the end intersection. |
| diversionMin2 | Geo Video event argument representing the minimum position on the diversion route for the end intersection. |
| diversionMax2 | Geo Video event argument representing the maximum position on the diversion route for the end intersection. |
| routeDiversionDetails | Filenames and details of the diversion route |
| clipDetails | List of video clips for the completed route |

| Operations | |
|---|---|
| Members | Description |
| Clear | Clears all of the Geo Video Services and the Clips array |
| FindIntersections | Populates both of the intersection arrays and displays the intersection push pins on the map |
| findIntersection1 | Populates the start intersection array |
| findIntersection2 | Populates the end intersection array |
| ViewIntersection1 | Synchronizes both GeoVideo Services (and all of their IObservers) to the Start Intersection |
| ViewIntersection2 | Synchronises both GeoVideo Services (and all of their IObservers) to the end Intersection |
| CreateDiversion | Creates the completed Geo Video Service for the addition of the diversion to the existing route. |
| createDiversionWaypoints | From the data create the new routes waypoints |
| createDiversionClips | Create the list of video clips for the new route |
| createAlternateEnding | Only add the diversion route after the End Intersection point No start intersection is selected. |
| createNormalDiversion | Add the new diversion route between the start and end intersection points Both intersection points are selected |
| createAlternateBeginning | Only add the diversion route before the Start Intersection point No end intersection is selected. |
| UpdateIntersection1 | Moves the start intersection point to a new location Updates all GeoServices and their IObservers Is only valid if on both routes and before the end intersection |
| UpdateIntersection2 | Moves the end intersection point to a new location Updates all GeoServices and their IObservers Is only valid if on both routes and after the start intersection |
| checkPossibleIntersection | Checks to see if a given point is acceptable to use a an intersection between two routes |

VideoRouteTrainer.Admin.RouteAdmin Class

| Attributes | |
|---|---|
| Members | Description |
| mapMain | Placeholder for the map control |
| videoMain | Placeholder for the Main Video Control |
| geoVideoServiceMain | GeoVideo Service representing a new route |
| newWaypoints | A list of new waypoints that are to be added |
| videoFileName | The filename of the video being added |
| gpsFileName | The file name of the GPS being added |
| inWay | The First waypoint of the route |
| outWay | The last waypoint on the route |

| Operations | |
|---|---|
| Members | Description |
| DisplayNewRoute | Draws the new GPS waypoints onto the main mapping control Loads the waypoints into the GeoVideo Service |
| DisplayNewVideo | Loads the new Video file into the video control |
| RemoveNewRoute | Removes the new route from the all of the controls |

-continued

| Operations | |
|---|---|
| Members | Description |
| checkGeoFile | Checks the selected file is ok and is a valid file |
| getWaypoints | |
| trimAndFixGPSData | Ensures the GPS coordinates are trimmed to 2 DP and that they are compatible with any regional variations NB assumes inputted coordinates have decimal point (.) |
| drawRoute | Draws the selected route onto the map window and zooms to it |
| showVideo | Shows the new route video |
| EditWaypoints | Show or Hide the Waypoint markers and set the Waypoint edit events |
| getGpsIdFromWaypoint | Returns the GPSId of a given GeoVideoEventArg The GPSId is the Database GPS record the waypoint belongs to. |
| InsertWaypoint | Inserts a Waypoint (GeoVideoEventArg) into the current route. Redraws the route to show the newly inserted waypoint. |
| checkForIdenticalWaypoint | Checks for Identical way points in the new route and removes them |

VideoRouteTrainer.GeoVideo.GeoVideoService Class

Attributes

| Members | Description |
|---|---|
| primaryVideo | Collection of Waypoints for the Primary Video |
| lastPosition | Represents the last know good position along a route |
| lastWaypointId | The ID of the waypoint immediately before the present position |
| nextWaypointId | The ID of the Waypoint immediately ahead of the present position |
| wayPointsDataService | The Data set containing all of the route information |
| spiderDataService | The Data set containing all of the route information for the spider map |
| xyPositionTolerance | Tolerance of user clicking on the map |

Operations

| | |
|---|---|
| GeoVideoService | Default Constructor |
| AddPrimaryWaypoint | Adds one way point to the primary video Waypoint collection |
| AddPrimaryWaypoints | Consumes an XML file conforming to the Inovas GeoData Schema and populates the GeoVideoService |
| RemoveAllWaypoints | Remove all the waypoints from the primary collections |
| addSecondryWaypoint | Adds one way point to the secondary video Waypoint collection |
| CompletePrimary | Completes the collection of Waypoints by deriving the remaining fields |
| CompleteSecondry | Completes the collection of Waypoints by deriving the remaining fields |
| completeWaypoints | Derives the routeTime & routeDistance fields |
| twoWaypointDistance | Gets the distance between two Waypoints |
| getPrimaryLocationFromVideoControl | Works out the coordinates from the clip and clip time |
| GetWaypointFromDistance | Gets a way point from a given distance |
| GetWaypointFromRouteTime | Gets a way point from a given route time |
| getWaypointFromDistance | Sets the lastPosition GeoVideoEventArgs to be the point defined by the PrimaryRoute object and the given distance |
| getRouteDistanceFromXY | Works out the distance along the given set of waypoint from the given x and y coordinates |
| getSpeed | Works out the average speed between two Waypoints |
| getAngle | Workds out the heading angle between two way points |
| SnapPrimaryWaypointToLine | Snap the collection of way point to the given line |
| setLastandNextWaypointIds | Sets the Waypoint Id variables so the synch engine can report the waypoints it is between |
| dumpPrimaryVideo | |
| Lookup | Gets a complete GeoVideoEventArgument from a Partial one if possible |

VideoRouteTrainer.GeoVideo.GeoVideoEventArgs Class

| Attributes | |
|---|---|
| Members | Description |
| x | X Coordinate |
| y | Y Coordinate |
| z | Z Coordinate |
| currentPositionMedia | The time in seconds of the current media CLIP |
| distanceOffset | The distance to offset along the route |
| playState | The current playstate of the media player |
| positionChange | Has the media been repositioned |
| routeDistance | The current total route distance from the start |
| routeTime | The current total route time from the start |
| clipId | The currently playing clip number |
| bearing | The bearing (degrees) of the route at this point |
| currentSpeed | The current speed of the route at this point |
| percentageComplete | The percentage of the route that has passed at this point |
| databaseId | The Id of the way point in the database |

What is claimed is:

1. An apparatus for providing assistance in management of a route followed by a person, the apparatus comprising:
   a data store configured to store a plurality of data streams corresponding to different kinds of information of a route followed by a person;
   data output means operable to output the plurality of data streams to a user such that the data streams are co-related to the route followed by the person; and
   data handling means operable to provide the stored plurality of data streams to the data output means, in which
   the plurality of data streams comprises a first data stream and a further data stream, the first and further data streams corresponding to different route information to each other,
   the data store being configured such that the plurality of data streams are not combined in the data store and such that the plurality of data streams comprise cross-referable data, and
   the data handling means is operable to provide the first data stream and the further data stream in a predetermined manner to the data output means and in dependence upon the cross-referable data such that the first and further data streams are output by the data output means in a substantially co-related manner.

2. The apparatus of claim 1 wherein the first data stream and the further data stream corresponds to information of different parts of the route to each other.

3. The apparatus of claim 2 wherein the first data stream corresponds to the whole of the route and the further data stream corresponds to only part of the route.

4. The apparatus of claim 2 wherein the first data stream corresponds to a first half of the route and the further data stream corresponds to a second half of the route.

5. The apparatus of claim 1 wherein the data handling means is operable to provide at least a part of the first data stream and at least a part of the further data stream at different times to the data output means.

6. The apparatus of claim 1 wherein the first data stream and the further data stream corresponds to the same kind of information.

7. The apparatus of claim 1 wherein the first data stream and the further data stream corresponds respectively to different kinds of information.

8. The apparatus of claim 7 wherein the first data stream corresponds to video data and the further data stream corresponds to comment data.

9. The apparatus of claim 8 wherein the comment data represents a fresh comment recorded on account of a change to the route.

10. The apparatus of claim 1 wherein the plurality of data streams comprises at least two data streams corresponding respectively to information of a different kind.

11. The apparatus of claim 1 wherein one of the plurality of data streams and the further data stream corresponds to the same kind of information.

12. The apparatus of claim 11 wherein the one of the plurality of data streams and the further data stream corresponds to information of the same part of the route.

13. The apparatus of claim 1 wherein the data handling means is configured for user operable selection between the one of the plurality of data streams and the further data stream.

14. The apparatus of claim 1 wherein, upon presentation of information of the route followed by the person to the user of the apparatus, the data handling means operates to provide the further data stream and the first data stream at different times to the data output means and in dependence upon the cross-referable data.

15. The apparatus of claim 14 wherein the first data stream is a video data stream and the further data stream is a video data stream of only a changed part of the route.

16. The apparatus of claim 1 wherein the data handling means is operable to provide only a part of the first data stream to the data output means.

17. The apparatus of claim 16 wherein the data handling means is then operable to provide the further data stream to the data output means.

18. The apparatus of claim 17 wherein the data handling means is then operative to provide another part of the first data stream to the data output means.

19. The apparatus of claim 1 wherein the data handling means is operable to provide at least two parts of the first data stream to the data output means, the two parts being spaced apart from each other on the route.

20. The apparatus of claim 1 wherein the cross-referable data comprises location data corresponding substantially to a location on the route followed by the person.

21. The apparatus of claim 20 in which the location data is acquired when route information is being recorded.

22. The apparatus of claim 21 wherein the location data is derived from a global navigation satellite system comprising at least one of Global Positioning System (GPS), GLONASS and Europe's GALILEO system.

23. A method of providing assistance in management of a route followed by a person, the method comprising:
   operating a data handling means of an apparatus to provide a plurality of data streams stored in a data store of the apparatus to a data output means, the plurality of data streams corresponding to different kinds of information of a route followed by a person; and
   operating a data output means of the apparatus to output the plurality of data streams to a user such that the plurality of data streams are co-related to the route followed by the person, in which the plurality of data streams comprises a first data stream and a further data stream, the first and further data streams corresponding to different route information to each other, the plurality of data streams are stored such that they are not combined in the data store and such that the plurality of data streams comprise cross-referable data, and the step of operating the data handling means comprises providing the first and further data streams in a predetermined manner to the data output means and in dependence upon the cross-referable data such that the first and further data streams are output by the data output means in a substantially co-related manner.

24. A computer program product for configuring a computer to provide assistance in management of a route followed by a person, the computer program product being embodied on a non-transitory computer readable medium and when executed by the computer causing the computer to carry out the steps of:

storing a plurality of data streams in a data store of the computer, the plurality of data streams corresponding to different kinds of information of a route followed by a person;

operating a data output means of the computer to output the plurality of data streams to a user such that they are co-related to the route followed by the person; and operating a data handling means of the computer to provide the stored plurality of data streams to the data output means, in which the plurality of data streams comprises a first data stream and a further data stream, the first and further data streams corresponding to different route information to each other, the step of storing comprises storing the plurality of data streams such that they are not combined in the data store and such that the plurality of data streams comprise cross-referable data, and the step of operating the data handling means comprises providing the first and further data streams in a predetermined manner to the data output means and in dependence upon the cross-referable data such that the first and further data streams are output by the data output means in a substantially co-related manner.

25. An apparatus for providing assistance in management of a route followed by a person, the apparatus comprising a data store configured to store a first data stream and a further data stream corresponding to information of a route followed by a person; data output means operable to output the first and further data streams to a user such that they are co-related to the route followed by the person; and data handling means operable to provide the first and further data streams to the data output means, in which the data store is configured such that the first and further data streams are not combined in the data store and such that the first and further data streams comprise cross-referable data, and the data handling means is operable to provide first and further data streams in a predetermined manner to the data output means and in dependence upon the cross-referable data such that the first and further data streams are output by the data output means in a substantially correlated manner.

* * * * *